United States Patent
Yi et al.

(10) Patent No.: US 10,225,833 B2
(45) Date of Patent: Mar. 5, 2019

(54) COMMUNICATION METHOD FOR DUAL CONNECTIVITY AND APPARATUS USING SAME

(71) Applicant: LG ELECTRONICS INC., Seoul (KR)

(72) Inventors: Yunjung Yi, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 151 days.

(21) Appl. No.: 15/128,509

(22) PCT Filed: Mar. 24, 2015

(86) PCT No.: PCT/KR2015/002889
§ 371 (c)(1),
(2) Date: Sep. 23, 2016

(87) PCT Pub. No.: WO2015/147529
PCT Pub. Date: Oct. 1, 2015

(65) Prior Publication Data
US 2018/0014290 A1 Jan. 11, 2018

Related U.S. Application Data

(60) Provisional application No. 61/969,272, filed on Mar. 24, 2014.

(51) Int. Cl.
*H04W 72/04* (2009.01)
*H04L 1/18* (2006.01)
(Continued)

(52) U.S. Cl.
CPC ......... *H04W 72/044* (2013.01); *H04L 1/1812* (2013.01); *H04L 1/1861* (2013.01);
(Continued)

(58) Field of Classification Search
CPC ......... H04L 47/10; H04L 47/12; H04L 47/20; H04L 47/24; H04L 47/32; H04L 47/38;
(Continued)

(56) References Cited

U.S. PATENT DOCUMENTS

| | | |
|---|---|---|
| 2012/0039302 A1 | 2/2012 | Chun et al. |
| 2012/0051306 A1 | 3/2012 | Chung et al. |

(Continued)

FOREIGN PATENT DOCUMENTS

| | | |
|---|---|---|
| CN | 102769902 A | 11/2012 |
| CN | 102970761 A | 3/2013 |

(Continued)

*Primary Examiner* — Dady Chery
(74) *Attorney, Agent, or Firm* — Birch, Stewart, Kolasch & Birch, LLP

(57) ABSTRACT

A communication method in a wireless communication system comprises: configuring a plurality of carrier aggregation groups (CAGs) by a wireless device; and receiving, through a first cell, configuration information about a control cell in which transmission of an uplink (UL) control channel is allowed. The plurality of CAGs comprises at least one cell, and one of the plurality of CAGs comprises the first cell.

8 Claims, 8 Drawing Sheets

(51) Int. Cl.
*H04L 5/00* (2006.01)
*H04W 76/27* (2018.01)

(52) U.S. Cl.
CPC ......... *H04L 5/001* (2013.01); *H04W 72/0406* (2013.01); *H04W 76/27* (2018.02)

(58) Field of Classification Search
CPC ......... H04L 47/70; H04L 47/72; H04L 47/74; H04L 47/78; H04L 47/80; H04L 47/22; H04L 47/225; H04L 47/18; H04L 47/52; H04L 28/02
See application file for complete search history.

(56) References Cited

U.S. PATENT DOCUMENTS

| | | | |
|---|---|---|---|
| 2012/0182858 A1 | 7/2012 | Nakao et al. | |
| 2013/0329678 A1 | 12/2013 | Pan et al. | |
| 2014/0192738 A1* | 7/2014 | Nam | H04L 5/001 370/329 |
| 2015/0195062 A1 | 7/2015 | Hwang et al. | |

FOREIGN PATENT DOCUMENTS

| | | |
|---|---|---|
| CN | 103404047 A | 11/2013 |
| CN | 103597757 A | 2/2014 |
| JP | 2013-255288 A | 12/2013 |
| WO | WO 2014/017746 A1 | 1/2014 |
| WO | WO 2014/021631 A1 | 2/2014 |

* cited by examiner

FIG. 6
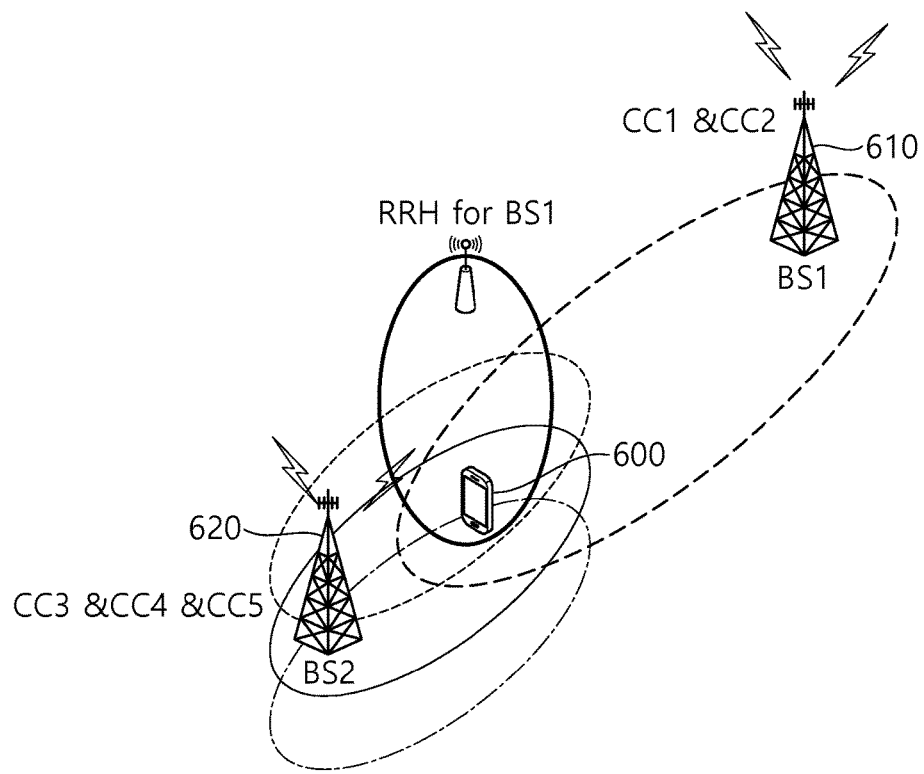
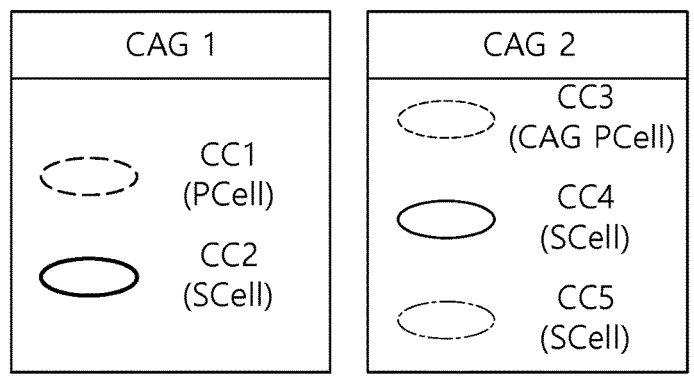

COMMUNICATION METHOD FOR DUAL CONNECTIVITY AND APPARATUS USING SAME

CROSS REFERENCE TO RELATED APPLICATIONS

This application is the National Phase of PCT International Application No. PCT/KR2015/002889, filed on Mar. 24, 2015, which claims priority under 35 U.S.C. 119(e) to U.S. Provisional Application No. 61/969,272, filed on Mar. 24, 2014, which is hereby expressly incorporated by reference into the present application.

BACKGROUND OF THE INVENTION

Field of the Invention

The present invention relates to wireless communication, and more particularly to a communication method for a dual connectivity in a wireless communication system and an apparatus using the same.

Related Art

Long term evolution (LTE)/-LTE-Advanced (LTE-A) based on 3rd generation partnership project (3GPP) technical specification (TS) releases 8-11 are widely employed mobile communication standard. Recently, next-generation mobile communication with higher efficiency is under standardization.

A carrier aggregation (CA) is a technique capable of providing a plurality of component carriers to the UE. Each component carrier may be defined as one cell. When the plurality of component carriers is configured for the UE, the UE may receive services from a plurality of serving cells.

Basically, a carrier aggregation (CA) assumes that a plurality of cells is managed by one base station. In order to provide a higher throughput, a dual connectivity has been discussed where a UE is served by a plurality of base stations. The dual connectivity allows one UE to use wireless links provided from different base stations unlike a single connectivity.

There has been proposed an uplink transmission method for applying the CA to the dual connectivity.

SUMMARY OF THE INVENTION

The present invention provides a communication method for a dual connectivity in a wireless communication system and an apparatus using the same.

In one aspect, a communication method in a wireless communication system includes configuring, by a wireless device, a plurality of carrier aggregation groups (CAGs), wherein the plurality of CAGs comprises at least one cell, and one of the plurality of CAGs comprises a first cell, and receiving, by the wireless device, configuration information on a control cell in which transmission of an uplink (UL) control channel is allowed through the first cell.

The communication method may further include receiving, by the wireless device, information on activation of the control cell through the first cell.

In another aspect, an apparatus in a wireless communication system includes a radio frequency (RF) unit configured to transmit and receive radio signals, and a processor, connected to the RF unit. The processor configures a plurality of carrier aggregation groups (CAGs), wherein the plurality of CAGs comprises at least one cell, and one of the plurality of CAGs comprises a first cell, and receives configuration information on a control cell in which transmission of an uplink (UL) control channel is allowed through the first cell.

An UL control channel may be flexibly transmitted in a dual connectivity environment.

BRIEF DESCRIPTION OF THE DRAWINGS

FIG. 6 illustrates an example of a dual connectivity.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. Alternatively, the wireless device may be a device supporting a data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

It is described hereinafter that the present invention is applied based on 3rd generation partnership project (3GPP) long term evolution (LTE)/LTE-advanced (LTE-A) based on 3GPP TS releases 8-11. This is for exemplary purposes only, and the present invention is also applicable to various wireless communication systems. In the following description, LTE and/or LTE-A are collectively referred to as LTE.

First, a CA is described.

In the CA, a wireless device may be served by a plurality of serving cells which is managed by one base station. Each serving cell may be defined by one downlink (DL) component carrier (CC) or a pair of a DL CC and an uplink (UL) CC.

The serving cell may be classified into a primary cell (hereinafter referred to as 'PCell') and a secondary cell (hereinafter referred to as 'SCell'). The PCell is a cell which operates at a primary frequency, performs an initial connection establishment procedure, starts a connection reestablishment procedure, or is designated as a PCell in a handover procedure. The PCell refers to a reference cell. The SCell may operate at a secondary frequency, may be configured after a Radio Resource Control (RRC) connection is established, and may be used to provide additional radio resources. Substantially, at least one PCell may be configured, and the SCell may be added/corrected/released according to uplink layer signaling (e.g., radio resource control (RRC)).

A cell index (CI) of the PCell may be fixed. For example, the lowest CI may be designated as the CI of the PCell. Hereinafter, a CI of the PCell is 0, and a CI of the SCell is sequentially allocated from 1.

Figure 1:
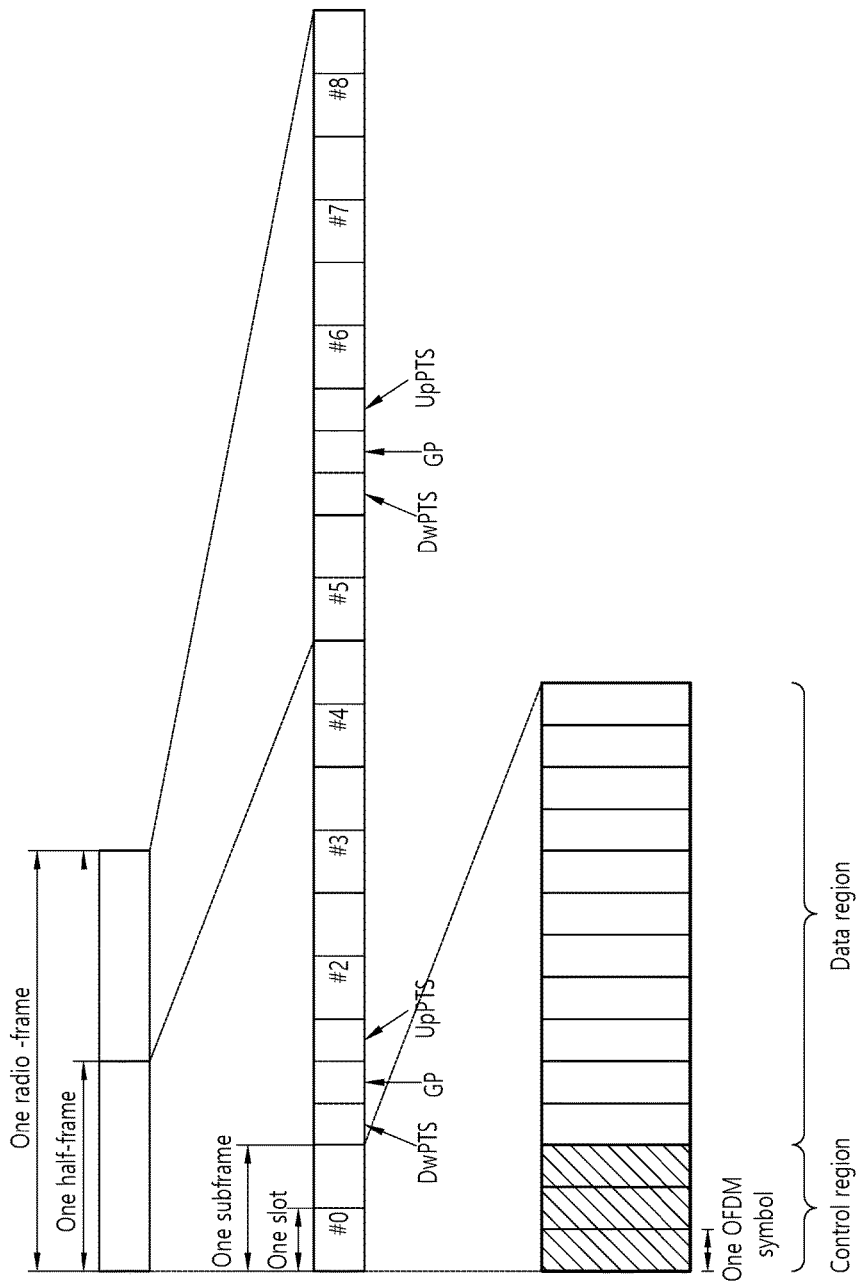
FIG. 1 illustrates a structure of a downlink radio frame in a 3GPP LTE.

FIG. 1 shows a structure of a downlink radio frame in 3GPP LTE-A. The section 6 of 3GPP TS 36.211 V11.2.0 (2013-02) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

Subframes having indexes #1 and #6 are called as special (S) subframes. A S subframe may include a downlink pilot time slot (DwPTS), a guard period (GP) and a uplink pilot time slot (UpPTS). The DwPTs may be used for initial cell search, synchronization and channel estimation. The UpPTS may be used for channel estimation at a BS, uplink synchronization at a wireless device. The GP, also called as a gap, may be a duration to mitigate uplink interference due to multi-path delay of a downlink signal between downlink and uplink.

In TDD, a subframe may be a DL subframe or a UL subframe. Table 1 shows an example of radio frame configuration.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe and 'S' denotes a S subframe.

When a UL-DL configuration is received from a BS, a wireless device can know which subframe is a DL subframe or a DL subframe in accordance with the UL-DL configuration.

A DL subframe is divided into a control region and a data region in the time domain. The control region includes up to first three OFDM symbols of a 1st slot in the subframe. However, the number of OFDM symbols included in the control region may vary. A physical downlink control channel (PDCCH) and other control channels are allocated to the control region, and a physical downlink shared channel (PDSCH) is allocated to the data region.

DL control channels are described as follows.

As disclosed in 3GPP TS 36.211 V11.2.0, the 3GPP LTE/LTE-A classifies a physical control channel into a physical downlink control channel (PDCCH), a physical control format indicator channel (PCFICH) and a physical hybrid-ARQ indicator channel (PHICH).

The PCFICH transmitted in a 1st OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH is transmitted by using a fixed PCFICH resource of the subframe, without having to perform blind decoding.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in first four OFDM symbols in a 2nd slot of a 1st subframe of a radio frame. The PBCH carries system information necessary for communication between the UE and the BS. The system information transmitted through the PBCH is referred to as a master information block (MIB). In comparison thereto, system information transmitted on the PDCCH indicated by the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The 3GPP LTE uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

To reduce a burden due to a blind decoding, 3GPP LTE uses a search space. The search space may be a CCE monitoring set for the PDCCH. A wireless device can monitor a PDCCH in the search space. The search space can be classified into a common search space (CSS) and a UE-specific search space (USS).

In 3GPP LTE, uplink channels include a physical uplink control channel (PUCCH) and a physical uplink shared channel (PUSCH).

Now, an HARQ performed in 3GPP LTE is described.

At present, in the 3GPP LTE, a DL HARQ uses an asynchronous HARQ mechanism, and a UL HARQ uses a synchronous HARQ mechanism.

When a PUSCH is transmitted in a subframe n, the following timing needs to be considered in the UL HARQ.

(1) k: a subframe n−k in which a PDCCH for carrying a UL grant for scheduling of the PUSCH is transmitted.

(2) j: a subframe n+j in which a PHICH for carrying ACK/NACK corresponding to the PUSCH is transmitted.

(3) r: a subframe n+j+r in which a retransmission PUSCH corresponding to the PHICH is transmitted.

Figure 2:
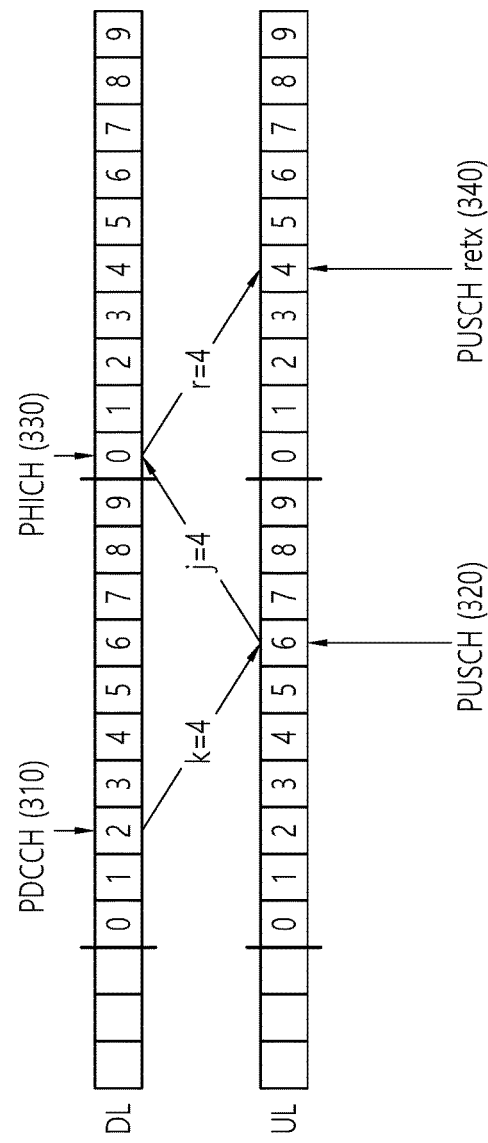
FIG. 2 illustrates an example of UL HARQ performing in an FDD.

FIG. 2 shows an example of performing a UL HARQ in FDD.

A wireless device receives a UL grant on a PDCCH 310 in a DL subframe n−k. The wireless device transmits a UL transport block in a subframe n on a PUSCH 320 indicated by the UL grant.

The wireless device receives an ACK/NACK signal for the UL transport block on a PHICH 330 in a subframe n+j. The ACK/NACK signal may be a reception acknowledgement for the UL transport block. The ACK/NACK signal becomes an ACK signal when the UL transport block is successfully decoded, and becomes an NACK signal when the DL transmission block fails in decoding. When the NACK signal is received, a BS may retransmit the DL transport block until the ACK signal is received or by up to the maximum number of retransmission attempts.

If the ACK/NACK signal is NACK, the wireless device performs retransmission on the PUSCH in a subframe n+j+r.

In FDD, a timing interval for transport block→ACK/NACK→retransmission is constant as 4 subframes. That is, k=j=r=4.

Figure 3:
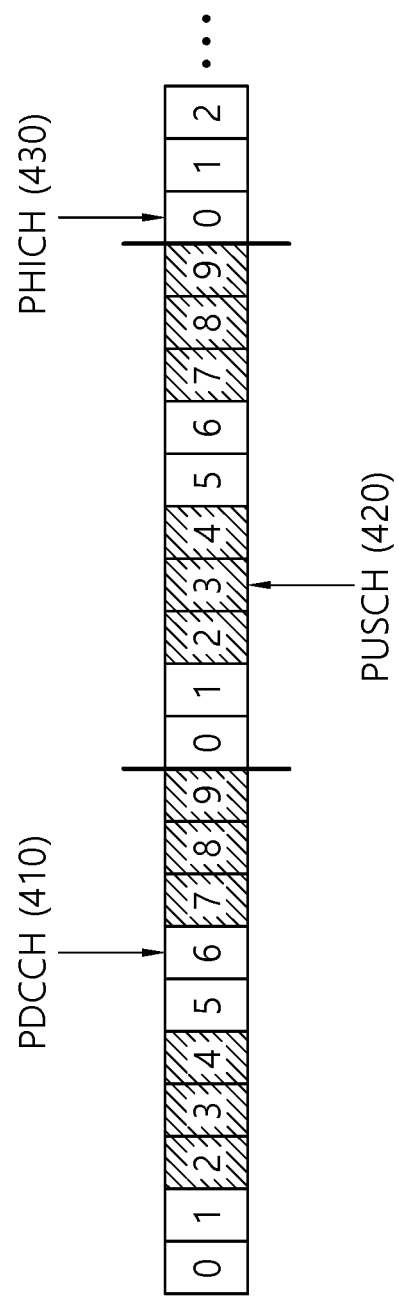
FIG. 3 illustrates an example of UL HARQ performing in a TDD.

FIG. 3 shows an example of performing a UL HARQ in TDD.

In case of TDD, a DL subframe and a UL subframe are selected according to a UL-DL configuration of Table 1, and there is a case where a ratio thereof is not matched to 1:1. Therefore, k, j, and r are not fixed.

The following table shows k for a subframe n−k in which a PDCCH corresponding to a PUSCH of a subframe n is transmitted in 3GPP LTE.

TABLE 2

| UL-DL configuration | subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 7/6 | 7 | 4 | — | — | 7/6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

FIG. 3 shows a case where a UL-DL configuration corresponds to 0, and n=3. A PDCCH 410 having a UL grant is received in a subframe n−k, and a PUSCH 420 is transmitted in a subframe n. ACK/NACK is received on a PHICH 430 in a subframe n+r.

Figure 4:
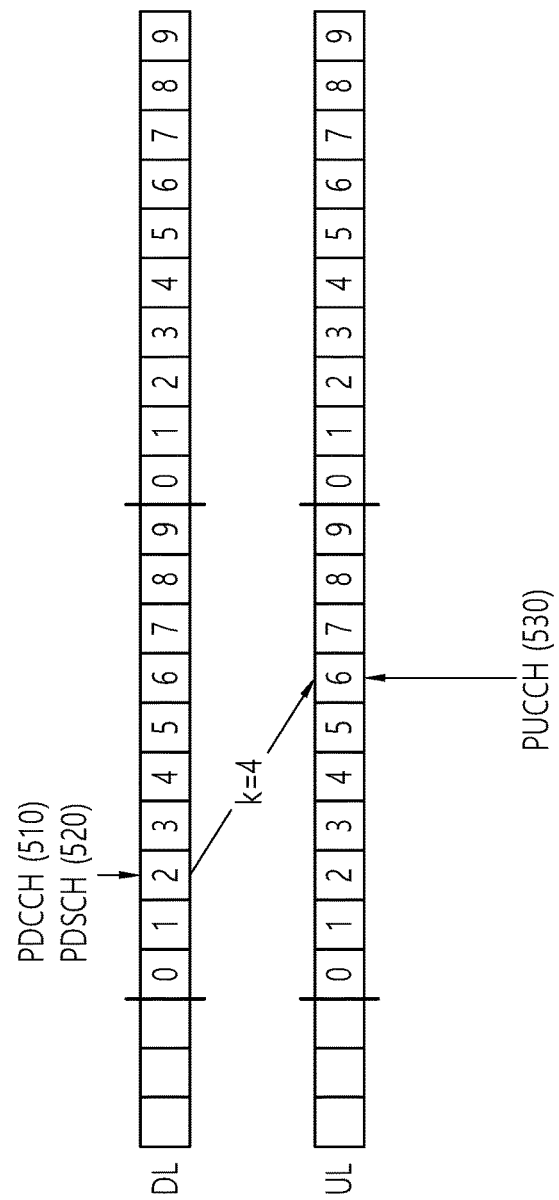
FIG. 4 illustrates an example of DL HARQ performing in an FDD.

FIG. 4 shows an example of performing a DL HARQ in FDD.

In the DL HARQ, there is a need to define a timing between a subframe n−k in which a PDCCH for carrying a DL grant for scheduling of the PDSCH is detected and a subframe n in which corresponding ACK/NACK is transmitted.

In FDD, it is fixed as n=4. For example, if a PDCCH 510 and a PDSCH 520 corresponding thereto are detected in a subframe 2, ACK/NACK is transmitted through a PUCCH 530 in a subframe 6.

In TDD, when PDSCH transmission is detected in a subframe n−k (k∈K), ACK/NACK for a corresponding transport block(s) is transmitted in a subframe n. K is defined as shown in the following table.

TABLE 3

| UL-DL configuration | subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In order to transfer ACK/NACK signal being reception acknowledgement for HARQ in a 3GPP LTE, a PUCCH format 1a/1b/3 is used.

All PUCCH formats use cyclic shift (CS) of a sequence in each OFDM symbol. A cyclic shifted sequence is generated by cyclically shifting a base sequence by a specific cyclic shift amount. The specific CS amount may be indicated by the CS index.

Figure 5:
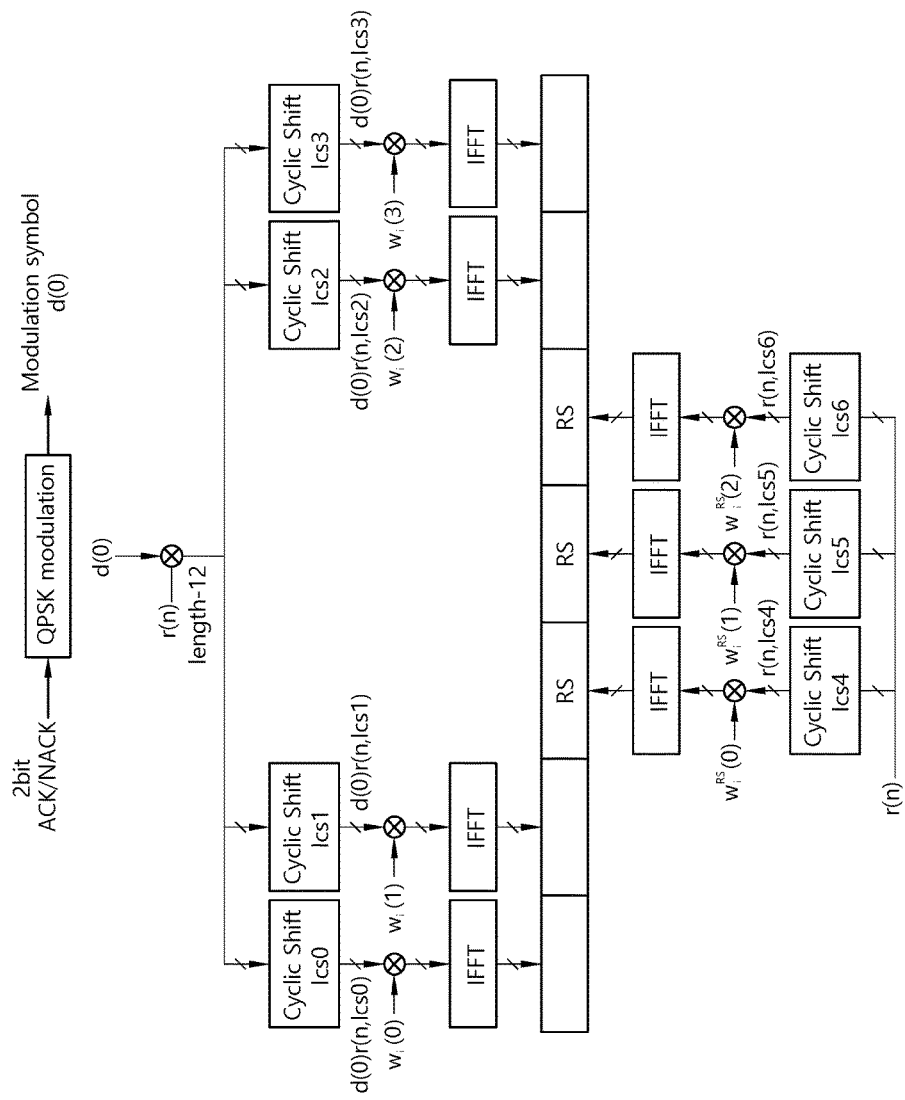
FIG. 5 illustrates a structure of a PUCCH format 1b in a 3GPP LTE.

FIG. 5 illustrates a structure of a PUCCH format 1b in a 3GPP LTE.

One slot includes seven OFDM symbols. Three OFDM symbols function as a RS OFDM symbol for a RS signal. Four OFDM symbols function as a data OFDM symbol for the ACK/NACK signal.

In a PUCCH format 1b, a modulation symbol d(0) is generated by Quadrature Phase Shift Keying (QPSK) modulating an encoded 2 bits ACK/NACK.

A cyclic shift index $I_{cs}$ may be changed according to a slot number n, in a radio frame and/or a symbol index 1 in a slot.

Since one slot includes four data OFDM symbols for transmitting the ACK/NACK signal in a normal CP, corresponding cyclic shift indexes refer to $I_{cs0}$, $I_{cs1}$, $I_{cs2}$, and $I_{cs3}$ in each OFDM symbol.

The modulation symbol d(0) spreads to a cyclic shifted sequence $r(n,I_{cs})$. If one dimension spread sequence corresponding to an (i+1)-th OFDM symbol is m(i), $\{m(0), m(1), m(2), m(3)\} = \{d(0)r(n,I_{cs0}), d(0)r(n,I_{cs1}), d(0)r(n,I_{cs2}), d(0)r(n,I_{cs3})\}$.

When orthogonal sequence $w_i(k)$ (i is a sequence index, $0 \leq k \leq K-1$) is given, two dimensional spreading sequences $\{s(0), s(1), s(2), s(3)\}$ may be expressed as $\{s(0), s(1), s(2), s(3)\} = \{w_i(0)m(0), w_i(1)m(1), w_i(2)m(2), w_i(3)m(3)\}$. Two dimensional spreading sequences $\{s(0), s(1), s(2), s(3)\}$ are transmitted in a corresponding OFDM symbol.

An orthogonal sequence index i, a cyclic shift index $I_{cs}$, and a resource block index m are parameters necessary for configure a PUCCH, and is resources used to identify the PUCCH (or UE). If the number of available cyclic shifts is 12 and the number of available orthogonal sequence indexes is 3, a PUCCH with respect to total 36 UEs may be multiplexed in one resource block.

In order to acquire the three parameters for configuring the PUCCH by the UE in the 3GPP LTE, a resource index $n^{(1)}_{PUCCH}$ is defined. A resource index $n^{(1)}_{PUCCH} = n_{CCE} + N^{(1)}_{PUCCH}$. An $n_{CCE}$ is a number of a first CCE used to transmit a corresponding DCI (that is, allocation of a downlink resource used to receive downlink data corresponding to the ACK/NACK signal). The $N^{(1)}PUUCH$ is a parameter informed by a higher layer message to the UE from the base station.

A time, a frequency, and a code resource used to transmit the ACK/NACK signal refer to an ACK/NACK resource or a PUCCH resource. As described above, an index of an ACK/NACK resource (ACK/NACK resource index or PUCCH index) necessary to transmit the ACK/NACK signal on a PUCCH may be expressed as at least one of an orthogonal sequence index i, a cyclic shift index $I_{cs}$, a resource block index m, and an index for acquiring the three indexes. The ACK/NACK resource may include at least one of an orthogonal sequence, a cyclic shift, a resource block, and a combination thereof.

In a network environment supporting the CA, the wireless device may be configured as a time division duplex (TDD) cell-frequency division duplex (FDD) cell as well as a TDD cell-TDD cell or a FDD cell-FDD cell. The TDD cell is a cell in which the TDD is configured and an FDD cell is a cell in which an FDD is configured.

An enhanced interference mitigation and traffic adaptation) (eIMTA) is a scheme for efficiently improving a traffic load and interference mitigation by dynamically changing UL-DL configuration in a TDD.

FIG. 6 illustrates an example of a dual connectivity.

The dual connectivity means a scheme where a radio device uses a radio resource provided from at least two different network nodes (e.g. base station) connected through a non-ideal backhaul. As compared with a situation in CA where time delay is not considered through one network node or ideal backhaul, the dual connectivity needs to consider time delay between network nodes.

It is assumed that a first base station 610 provides two serving cells CC1 and CC2 to the wireless device 600, and a second based station 620 provides three serving cells CC3, CC4, and CC5. The number of network nodes and the number of serving cells are illustrative purpose only.

A group of CA cells provided from different network nodes refers to a carrier aggregation group (CAG). A CAG1 includes a CC1 and a CC2, and a CAG2 includes a CC3, a CC4, and a CC5.

One of a plurality of serving cells is a PCell. In this case, a CC1 of the CAG1 refers to a PCell. Remaining cells are SCells activated/inactivated by a PCell. As a plurality of CAGs are configured, radio link monitoring or mobility management may be required per eacg CAG. Further, current PUCCH transmission is achieved in only PCell, which means that a HARQ ACK/NACK of the CAG2 is transmitted from a CC1 of a CAG1. That is because the CC1 is the PCell. Accordingly, when time delay of the CAG2 is relatively great, PUCCH transmission of the CC1 may not be efficient.

Hereinafter, a SCell configured to allow transmission of an UL control channel refers to a CAG PCell or a control cell. In this case, a CC3 in a CAG2 is configured as a CAG PCell.

Each CAG may include one or more control cells. A control cell may not be configured in a CAG including the PCell.

The control cell has a characteristic of a PCell by allowing transmission of the UL control channel, and has a characteristic of the SCell activated/inactivated by the PCell.

Figure 7:
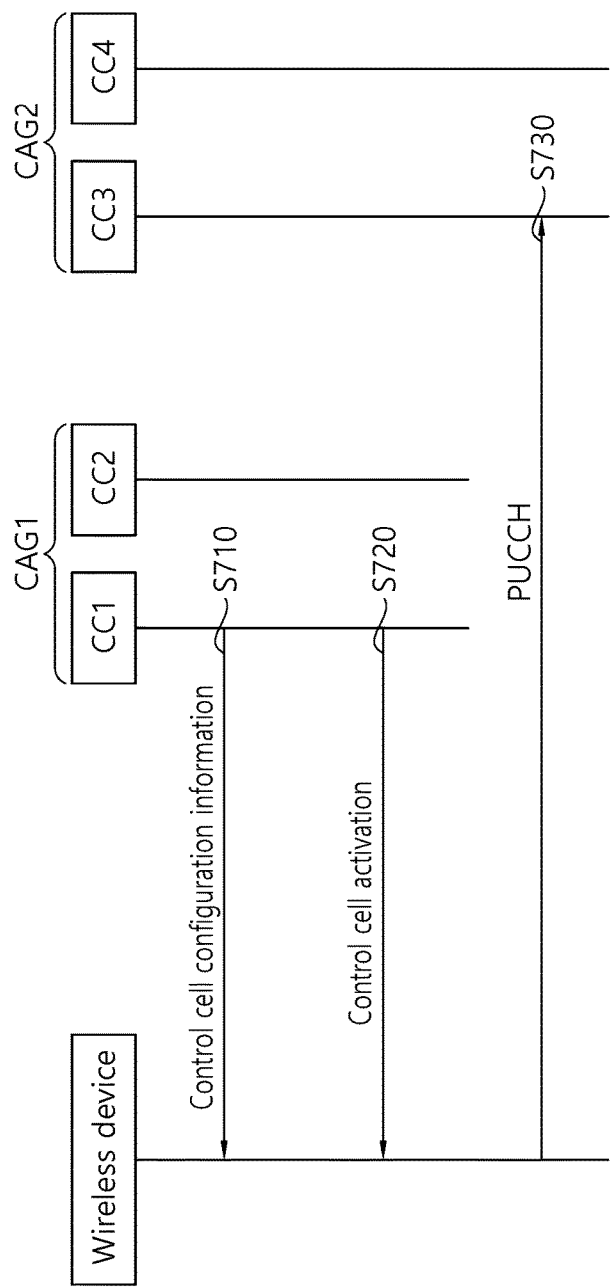
FIG. 7 illustrates a communication method according to an embodiment of the present invention.

FIG. 7 illustrates a communication method according to an embodiment of the present invention.

A CAG1 includes a CC1 and a CC2, and a CAG2 includes a CC3 and a CC4. The CC1 refers to a PCell.

At step S710, a wireless device receives control cell configuration information from a PCell. The control cell configuration information may be transmitted through an RRC message or an MAC message. The control cell configuration information may include at least one of a CI of a SCell configured as a control cell, frequency information of the SCell configured as a control cell, a PUCCH resource of the control cell, a reference HARQ timing, and a reference UL-DL configuration.

At step S720, the wireless device receives control cell activation information from the PCell. The control cell activation information may be transmitted through an RRC message or an MAC message.

The control cell configuration information and the control cell activation information may be received through a separate messages, but may be received through one message.

At step S730, the wireless device transmits a PUCCH to a control cell. The PUCCH may include at least one of HARQ ACK/NACK, Channel Quality Indicator (CQI) and a rank indicator (RI) for a CAG2.

The SCell may be inactivated anytime. Accordingly, if the control cell is inactivated, PUCCH transmission is unavailable and it may be difficult to perform the HARQ. Accordingly, when the control cell is inactivated or changed, there may be a need to change the HARQ timing.

In order to dynamically and flexibly change a SCell state, there is suggested a procedure for allocating a reference HARQ timing and a reference UL-DL configuration per each CAG. Although the CAG includes only an FDD cell, a reference UL-DL configuration may be given to add a new TDD cell.

The HARQ timing may include a timing when a HARQ ACK/NACK for cells in a CAG is transmitted. For example, in the UL-DL configuration of Table 1, a subframe #2 is always UL subframe. Accordingly, a reference HARQ timing may be given to transmit ACK/NACK in the subframe #2.

The reference UL-DL configuration may be used to configure DL/UL of a TDD and/or a HARQ timing. For example, the reference UL-DL configuration may be one of UL-DL configurations of Table 1. Accordingly, the HARQ timing of Table 3 may be configured.

The PUCCH resource for a control cell may be separately given. For example, a resource index for PUCCH format 1a/1b is defined as $n^{(1)}_{PUCCH} = n_{CCE} + N^{(1)}_{PUCCH}$. The $N^{(1)}_{PUCCH}$ may be control cell-specific. Alternatively, the resource index $n^{(1)}_{PUCCH} = n_{CCE} + N^{(1)}_{PUCCH} + N_{CC}$. The Ncc may be given in control cell configuration information.

Figure 8:
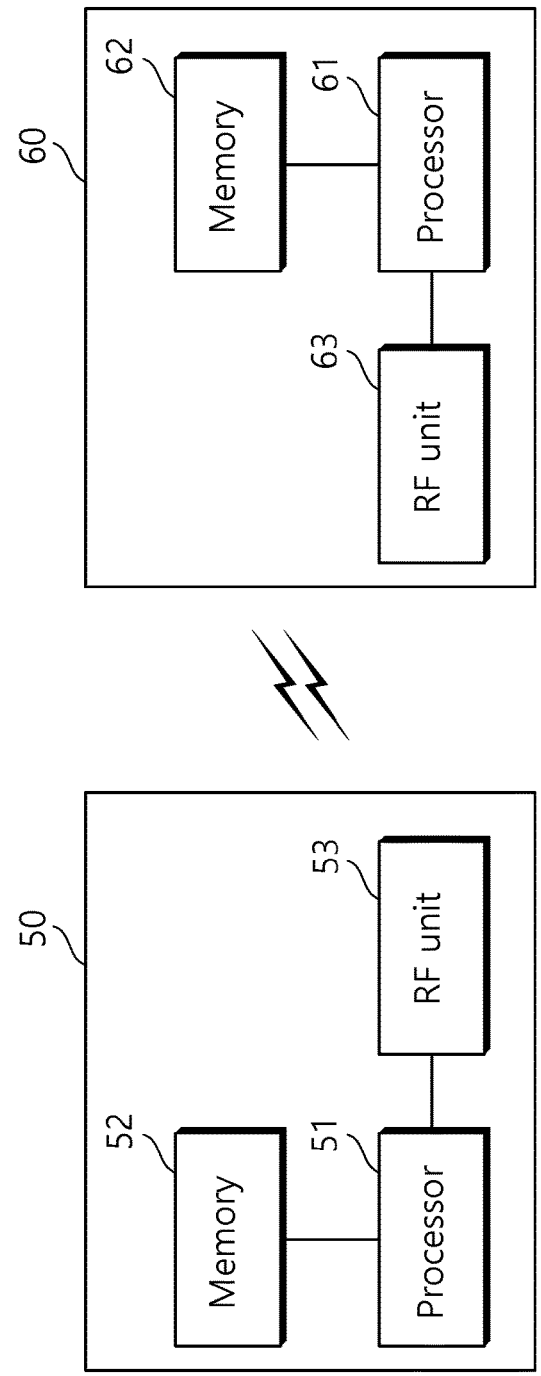
FIG. 8 is a block diagram illustrating a wireless communication system according to an embodiment of the present invention.

FIG. 8 is a block diagram showing a wireless communication system according to an embodiment of the present invention.

A BS 50 includes a processor 51, a memory 52, and a radio frequency (RF) unit 53. The memory 52 is coupled to the processor 51 to store a variety of information for driving the processor 51. The RF unit 53 is coupled to the processor 51 to transmit and/or receive a radio signal. The processor 51 implements the proposed functions, procedures, and/or methods. In the aforementioned embodiment, an operation of the BS or a cell may be implemented by the processor 51.

A wireless device 60 includes a processor 61, a memory 62, and an RF unit 63. The memory 62 is coupled to the processor 61 to store a variety of information for driving the processor 61. The RF unit 63 is coupled to the processor 61 to transmit and/or receive a radio signal. The processor 61 implements the proposed functions, procedures, and/or methods. In the aforementioned embodiment, an operation of the wireless device may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A communication method, performed by a wireless device connected to a first eNodeB (eNB) and a second eNB via dual connectivity, in a wireless communication system, the method comprising:
   configuring, by the wireless device, a first carrier aggregation group (CAG) served by the first eNB and a second CAG served by the second eNB, wherein the first CAG comprises a first cell and the second CAG comprises a control cell;
   receiving, by the wireless device, configuration information on the control cell in which transmission of a physical uplink control channel (PUCCH) is allowed, through the first cell; and
   transmitting, by the wireless device, the PUCCH to the control cell, based on the received configuration information,
   wherein the received configuration information comprises at least one of information on a cell identity (ID) of the control cell, frequency information of the control cell and information on a hybrid automatic repeat request (HARQ) timing of the second CAG.

2. The communication method of claim 1, further comprising receiving, by the wireless device, information on activation of the control cell through the first cell.

3. The communication method of claim 1, wherein the configuration information comprises information on a reference uplink (UL)-downlink (DL) configuration.

4. The communication method of claim 1, wherein the configuration information comprises information on resource allocation of the PUCCH.

5. The communication method of claim 1, wherein the configuration information is received through a radio link resource (RRC) message.

6. An apparatus connected to a first eNodeB (eNB) and a second eNB via dual connectivity, in a wireless communication system, the apparatus comprising:
   a transceiver configured to transmit and receive radio signals; and
   a processor, connected to the transceiver,
       configures a first carrier aggregation group (CAG) served by the first eNB and a second CAG served by the second eNB, wherein the first CAG comprises a first cell and the second CAG comprises a control cell;
       controls the transceiver to receive configuration information on the control cell in which transmission of a physical uplink control channel (PUCCH) is allowed, through the first cell; and
       controls the transceiver to transmit the PUCCH to the control cell, based on the received configuration information,
   wherein the received configuration information comprises at least one of information on a cell identity (ID) of the control cell, frequency information of the control cell and information on a hybrid automatic repeat request (HARQ) timing of the second CAG.

7. The apparatus of claim 6, wherein the processor further controls the transceiver to receive information on activation of the control cell through the first cell.

8. The apparatus of claim 6, wherein the configuration information comprises information on a reference uplink (UL)-downlink (DL) configuration.

* * * * *